US010247239B2

(12) United States Patent
Minegishi et al.

(10) Patent No.: US 10,247,239 B2
(45) Date of Patent: Apr. 2, 2019

(54) TILTING-PAD BEARING AND TURBO COMPRESSOR

(71) Applicant: IHI Rotating Machinery Engineering Co., Ltd., Tokyo (JP)

(72) Inventors: Atsushi Minegishi, Tokyo (JP); Toshimichi Taketomi, Tokyo (JP)

(73) Assignee: IHI ROTATING MACHINERY ENGINEERING CO., LTD., Tokyo (JP)

( * ) Notice: Subject to any disclaimer, the term of this patent is extended or adjusted under 35 U.S.C. 154(b) by 383 days.

(21) Appl. No.: 14/994,182

(22) Filed: Jan. 13, 2016

(65) Prior Publication Data

US 2016/0123391 A1 May 5, 2016

Related U.S. Application Data

(63) Continuation of application No. PCT/JP2014/068493, filed on Jul. 10, 2014.

(30) Foreign Application Priority Data

Aug. 1, 2013 (JP) .................................. 2013-160519

(51) Int. Cl.
*F04D 29/046* (2006.01)
*F16C 33/10* (2006.01)
*F16C 17/03* (2006.01)

(52) U.S. Cl.
CPC ........ *F16C 33/1085* (2013.01); *F04D 29/046* (2013.01); *F16C 17/03* (2013.01); *F16C 33/1045* (2013.01); *F16C 2360/44* (2013.01)

(58) Field of Classification Search
None
See application file for complete search history.

(56) References Cited

U.S. PATENT DOCUMENTS

| 4,764,034 A | 8/1988 | Fust et al. | |
|---|---|---|---|
| 5,007,745 A * | 4/1991 | Ball | F16C 17/06 384/307 |
| 6,739,756 B2 * | 5/2004 | Miller | F16C 17/03 384/117 |

(Continued)

FOREIGN PATENT DOCUMENTS

| CN | 1776241 A | 5/2006 |
|---|---|---|
| CN | 101216065 A | 7/2008 |

(Continued)

OTHER PUBLICATIONS

International Search Report, PCT/JP2014/068493, dated Aug. 26, 2014, 1 pg.

*Primary Examiner* — Jason D Shanske
*Assistant Examiner* — Theodore C Ribadeneyra
(74) *Attorney, Agent, or Firm* — Volpe and Koenig, P.C.

(57) ABSTRACT

The tilting-pad bearing includes: a plurality of tilting pads arranged around a rotary shaft; a housing including a lubricating oil-supplying hole provided at a position facing a gap formed between the tilting pads disposed next to each other; and a pair of side plates disposed so that the tilting pads are interposed therebetween. The tilting pad is provided with an internal flow passageway through which lubricating oil flow. The internal flow passageway includes a first inflow opening, a second inflow opening, and a discharge opening.

7 Claims, 5 Drawing Sheets

(56) References Cited

U.S. PATENT DOCUMENTS

| | | | |
|---|---|---|---|
| 8,328,424 B2 | 12/2012 | Seim et al. | |
| 9,739,310 B2 * | 8/2017 | Dourlens | F16C 33/02 |
| 2003/0030225 A1 * | 2/2003 | Uesugi | F16C 17/026 |
| | | | 277/431 |
| 2010/0209030 A1 | 8/2010 | Seim et al. | |
| 2014/0270607 A1 * | 9/2014 | Livermore-Hardy | |
| | | | F16C 37/002 |
| | | | 384/117 |

FOREIGN PATENT DOCUMENTS

| | | |
|---|---|---|
| CN | 101675258 A | 3/2010 |
| JP | 51-055846 A | 5/1976 |
| JP | 52-137549 A | 11/1977 |
| JP | 53-048149 A | 5/1978 |
| JP | 58-030523 A | 2/1983 |
| JP | 2001-200847 A | 7/2001 |
| JP | 2003-113834 A | 4/2003 |
| JP | 2006-112499 A | 4/2006 |
| JP | 2006-234147 A | 9/2006 |
| JP | 2010-242816 A | 10/2010 |
| JP | 2010-242842 A | 10/2010 |
| JP | 2010-249200 A | 11/2010 |

\* cited by examiner

TILTING-PAD BEARING AND TURBO COMPRESSOR

The present disclosure relates to a tilting-pad bearing and a turbo compressor.

This application is a Continuation Application based on International Application No. PCT/JP2014/068493, filed Jul. 10, 2014, which claims priority on Japanese Patent Application No. 2013-160519, filed Aug. 1, 2013, the contents of both of which are incorporated herein by reference.

TECHNICAL FIELD

Background

For example, a rotary shaft of a turbo compressor is rotatably supported by a tilting-pad bearing including tilting pads which are supported by a housing of the bearing so as to be tiltable. Such a tilting-pad bearing is a kind of slide bearing in which a rotary shaft is slidably supported by a plurality of tilting pads arranged annularly around the rotary shaft.

The tilting pad is heated due to sliding friction during rotation of the rotary shaft. Therefore, for example, in Patent Documents 1 to 3, the inside of the tilting pad is provided with an internal flow passageway through which lubricating oil flows, the lubricating oil being used for reducing rotation resistance (sliding friction) of the rotary shaft, and cooling for the tilting pad is performed by lubricating oil flowing through the flow passageway.

In addition, Patent Documents 4 and 5 disclose a tilting-pad bearing which includes a plurality of tilting pads, a housing that holds the tilting pads, and a pair of side plates that are provided on two sides of the tilting pad. The housing is provided with an oil supply passageway which supplies lubricating oil into a gap between the tilting pads disposed next to each other, and the side plate is provided with a notch (an oil discharge hole) which discharges lubricating oil.

DOCUMENT OF RELATED ART

Patent Document

[Patent Document 1] Japanese Unexamined Patent Application, First Publication No. 2003-113834
[Patent Document 2] Japanese Unexamined Patent Application, First Publication No. S52-137549
[Patent Document 3] Japanese Unexamined Patent Application, First Publication No. 2006-112499
[Patent Document 4] Japanese Unexamined Patent Application, First Publication No. 2010-242842
[Patent Document 5] Japanese Unexamined Patent Application, First Publication No. 2010-242816

SUMMARY

Technical Problem

In recent years, the capacity of a turbo compressor has been increased, and the size of a tilting-pad bearing has also been increased. If the size of the tilting-pad bearing is increased, the size of a tilting pad is also naturally increased. If the size of the tilting pad is increased, since the sliding surface of the tilting pad facing the rotary shaft is expanded or the heat capacity of the tilting pad is increased, further efficient cooling for the tilting pad may be required.

The present disclosure has been made in view of the above circumstances, and an object thereof is to improve the cooling efficiency of a tilting pad included in a tilting-pad bearing.

Solution to Problem

The present disclosure adopts the following configurations as means to solve the above problems.

A first aspect of the present disclosure is a tilting-pad bearing including: a plurality of tilting pads arranged annularly around a rotary shaft so as to form a gap therebetween; a housing accommodating and supporting the plurality of tilting pads from outside in the radial direction of the rotary shaft and including a lubricating oil-supplying hole provided at a position facing the gap formed between the tilting pads disposed next to each other; and a pair of side plates disposed so that the tilting pads are interposed between the side plates in the axial direction of the rotary shaft. In addition, a tilting pad is provided with an internal flow passageway through which lubricating oil flows, and the internal flow passageway includes: a first inflow opening which opens toward a leading side of the tilting pad in the rotation direction of the rotary shaft; a second inflow opening which opens toward a trailing side of the tilting pad in the rotation direction of the rotary shaft; and a discharge opening which opens in the axial direction of the rotary shaft.

A second aspect of the present disclosure is that in the tilting-pad bearing of the first aspect, a gap is formed between a side plate and an outer circumferential surface of the rotary shaft, and exposes at least part of the discharge opening of the tilting pad to outside of the tilting-pad bearing.

A third aspect of the present disclosure is that in the tilting-pad bearing of the first or second aspect, a side plate is divided into parts, and a gap is provided between the parts disposed next to each other.

A fourth aspect of the present disclosure is that in the tilting-pad bearing of any one of the first to third aspects, a side plate includes an opening which exposes to outside of the tilting-pad bearing, at least part of the gap formed between the tilting pads disposed next to each other.

A fifth aspect of the present disclosure is that in the tilting-pad bearing of any one of the first to fourth aspects, the opening area of the second inflow opening is greater than that of the first inflow opening.

A sixth aspect of the present disclosure is a turbo compressor including: an impeller; and a rotary shaft connected to the impeller. In addition, the tilting-pad bearing according to any one of claims 1 to 5 rotatably supports the rotary shaft.

Effects

According to the present disclosure, an internal flow passageway provided in a tilting pad includes: a first inflow opening which opens at a leading side of the tilting pad in the rotation direction of a rotary shaft; and a second inflow opening which opens at a trailing side of the tilting pad in the rotation direction of the rotary shaft. Therefore, in the present disclosure, lubricating oil flows into the inside of the tilting pad from both of the leading side and the trailing side of the tilting pad in the rotation direction of the rotary shaft. Thus, a large amount of lubricating oil can be imported into the inside of the tilting pad. Furthermore, in the present disclosure, the lubricating oil which has flowed into the internal flow passageway from the first and second inflow openings is discharged from a discharge opening which opens in the axial direction of the rotary shaft, without flowing backward. Therefore, the lubricating oil can smoothly flow through the internal flow passageway, and the flow velocity of the lubricating oil in the internal flow passageway can be increased. Thus, according to the present disclosure, since a large amount of lubricating oil smoothly flows through the inside of the tilting pad, the cooling efficiency of the tilting pad can be improved.

DESCRIPTION OF EMBODIMENTS

Hereinafter, an embodiment of a tilting-pad bearing and a turbo compressor of the present disclosure is described with reference to the drawings. In the following drawings, the scale of each member is appropriately changed in order to show each member in a recognizable size.

Figure 1:
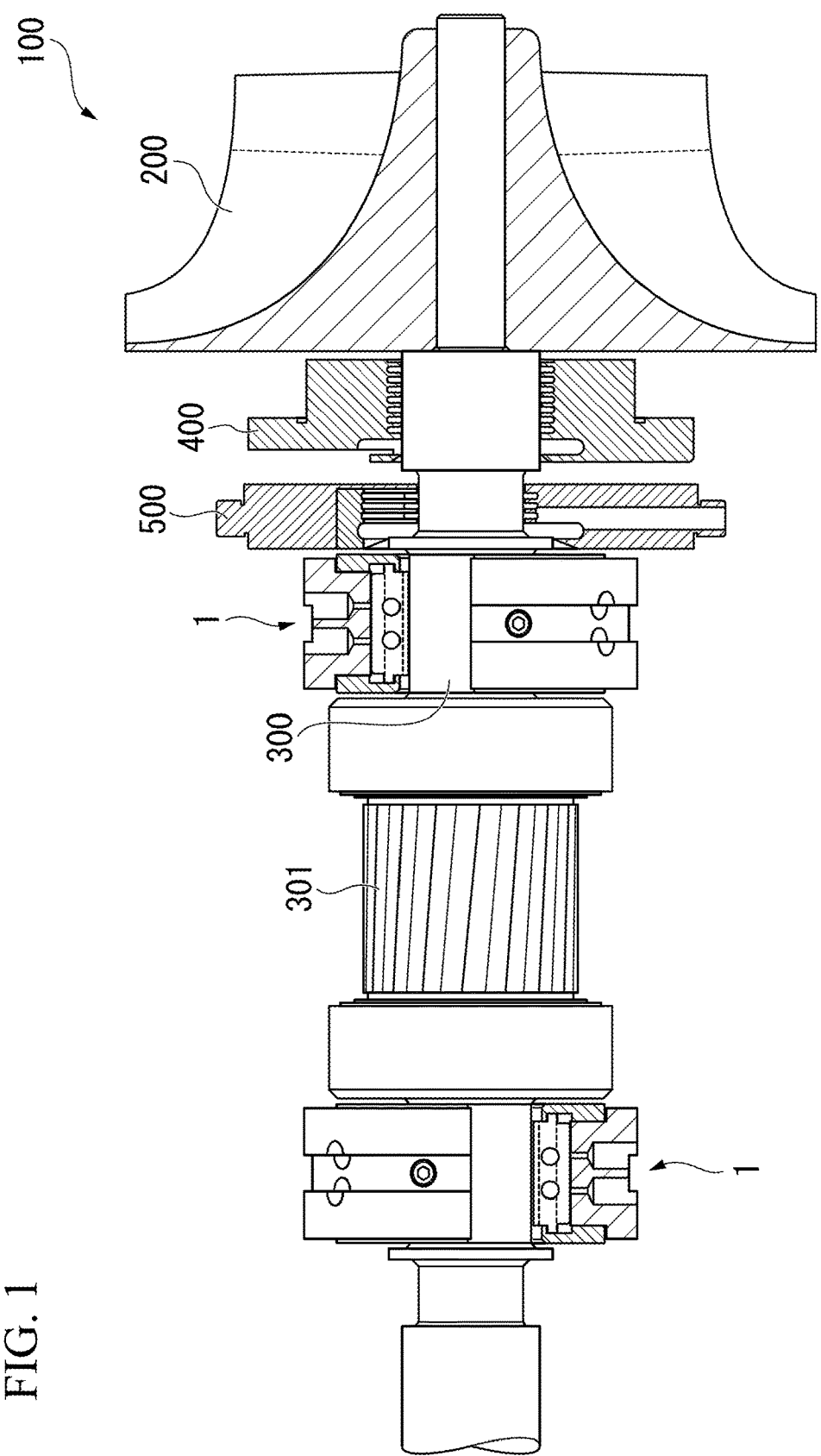
FIG. 1 is a partial cross-sectional view showing part of a turbo compressor including a tilting-pad bearing of an embodiment of the present disclosure.

FIG. 1 is a partial cross-sectional view showing part of a turbo compressor 100 including a tilting-pad bearing 1 of this embodiment. The turbo compressor 100 includes an impeller 200 and a rotary shaft 300 whose one end is connected with the impeller 200 and whose middle part is provided with a gear 301, and the tilting-pad bearing 1 of this embodiment rotatably supports the rotary shaft 300. FIG. 1 shows two tilting-pad bearings 1 which rotatably support the rotary shaft 300. An air seal 400 and an oil seal 500 are provided between the impeller 200 and the tilting-pad bearing 1 positioned to be close to the impeller 200.

The turbo compressor 100 is a two-stage compressor. The tilting-pad bearing 1, the impeller 200, the air seal 400 and the oil seal 500 are provided in each of two end portions of the rotary shaft 300. However, FIG. 1 shows the impeller 200, the air seal 400 and the oil seal 500 which are positioned in the right end portion of the rotary shaft 300, and omits the impeller 200, the air seal 400 and the oil seal 500 which are positioned on the left side of the rotary shaft 300. FIG. 1 also omits a housing and a driving mechanism, the housing accommodating the impellers 200 and the like and being provided with flow passageways for air (a fluid to be compressed), the driving mechanism being configured to rotationally drive the rotary shaft 300. In addition, FIG. 1 shows a state where a quarter of the tilting-pad bearing 1 in the circumferential direction around the rotary shaft 300 is cut out from the tilting-pad bearing 1. That is, FIG. 1 shows a side view of the tilting-pad bearing 1 including a cross-sectional view of part of the tilting-pad bearing 1.

In such a turbo compressor 100, when the driving mechanism rotationally drives the rotary shaft 300, the rotary shaft 300 rotates in a state of being supported by the tilting-pad bearings 1, and the impeller 200 is rotationally driven. The impeller 200 is rotationally driven, and thereby air which has been supplied into the housing is compressed and thereafter is discharged to outside of the turbo compressor.

Next, the tilting-pad bearing 1 of this embodiment is described in detail with reference to FIGS. 2A to 3C.

Figure 2A:
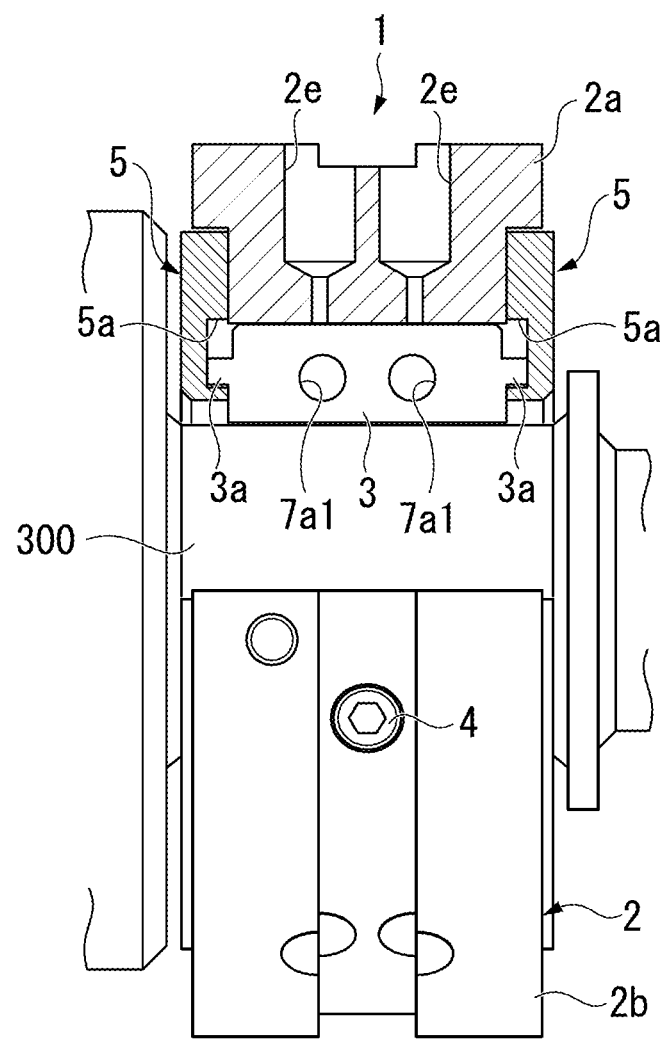
FIG. 2A is a side view of the tilting-pad bearing of the embodiment of the present disclosure.
Figure 2B:
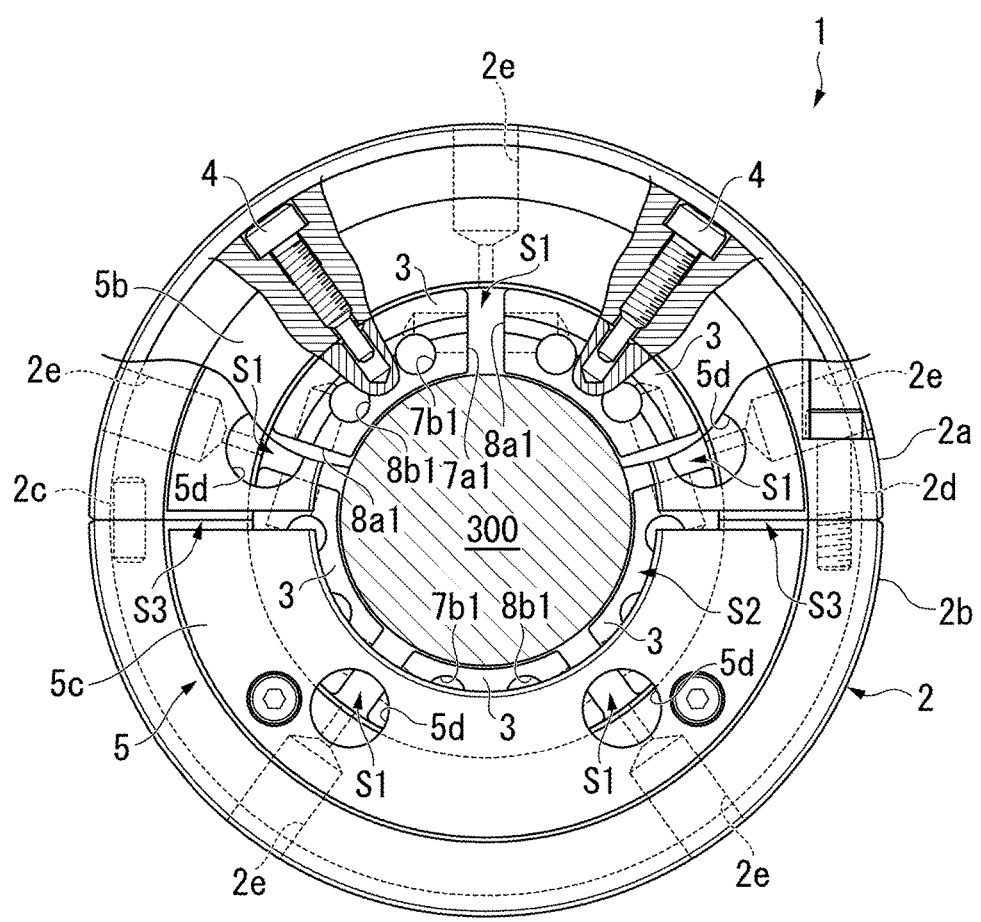
FIG. 2B is a front view of the tilting-pad bearing of the embodiment of the present disclosure.

FIG. 2A is a side view of the tilting-pad bearing 1 of this embodiment, and FIG. 2B is a front view of the tilting-pad bearing 1 of this embodiment. FIGS. 2A and 2B show partial cross-sectional views of the tilting-pad bearing 1 obtained by cutting out part thereof in order to improve the visibility of the internal structure of the tilting-pad bearing 1.

As shown in these drawings, the tilting-pad bearing 1 of this embodiment includes a housing 2, a plurality of tilting pads 3, a fixing pin 4 provided on each tilting pad 3, and two side plates 5.

The housing 2 is an annular member accommodating and supporting the plurality of tilting pads 3 from outside in the radial direction of the rotary shaft 300. As shown in FIG. 2B, the housing 2 includes an upper-side portion 2a and a lower-side portion 2b which are capable of being separated from each other in the vertical direction, a positioning pin 2c which positions the upper-side portion 2a and the lower-side portion 2b, and a bolt 2d which fastens the upper-side portion 2a and the lower-side portion 2b.

As shown in FIG. 2B, the housing 2 is provided with lubricating oil-supplying holes 2e which penetrate the housing 2 from the outer circumferential surface to the inner circumferential surface thereof. The lubricating oil-supplying holes 2e guide toward the rotary shaft 300, lubricating oil supplied from a pump (not shown) or the like. In this embodiment, in order to supply lubricating oil into all gaps S1, each gap S1 being formed between the tilting pads 3 disposed next to each other, the lubricating oil-supplying holes 2e are provided so as to correspond to the positions of the gaps S1. That is, the lubricating oil-supplying hole 2e is provided at a position facing a gap formed between the tilting pads 3 disposed next to each other. In other words, the lubricating oil-supplying hole 2e and a gap formed between the tilting pads 3 disposed next to each other are arranged in series in the radial direction of the rotary shaft 300. In addition, as shown in FIG. 2A, two lubricating oil-supplying holes 2e are provided so as to face each gap S1, and are arranged in the axial direction of the rotary shaft 300. The inner diameter of the lubricating oil-supplying hole 2e in this embodiment decreases from the outer circumferential surface to the inner circumferential surface of the housing 2. That is, the opening of the lubricating oil-supplying hole 2e at the outer circumferential surface of the housing 2 is set to be larger than that at the inner circumferential surface of the housing 2. However, the present disclosure is not limited to this configuration, and the inner diameter of the lubricating oil-supplying hole 2e may be constant.

The plurality of tilting pads 3 are arranged annularly around the rotary shaft 300 so as to form the gaps S1 therebetween, and slidably support the rotary shaft 300. A surface of the tilting pad 3 is coated with, for example, a white metal (a Babbitt metal). As shown in FIG. 2B, in this embodiment, five tilting pads 3 are disposed at regular intervals in the circumferential direction of the rotary shaft 300.

Figure 3A:
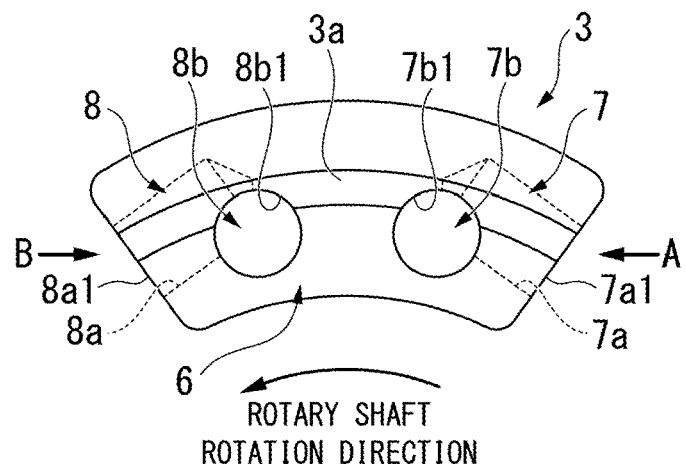
FIG. 3A is a front view of a tilting pad included in the tilting-pad bearing of the embodiment of the present disclosure.
Figure 3B:
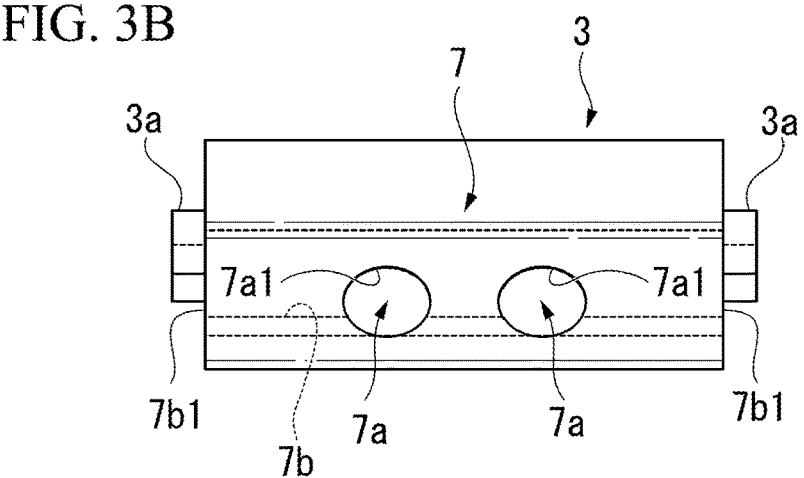
FIG. 3B is a side view obtained by viewing the tilting pad in an arrow A direction in FIG. 3A.
Figure 3C:
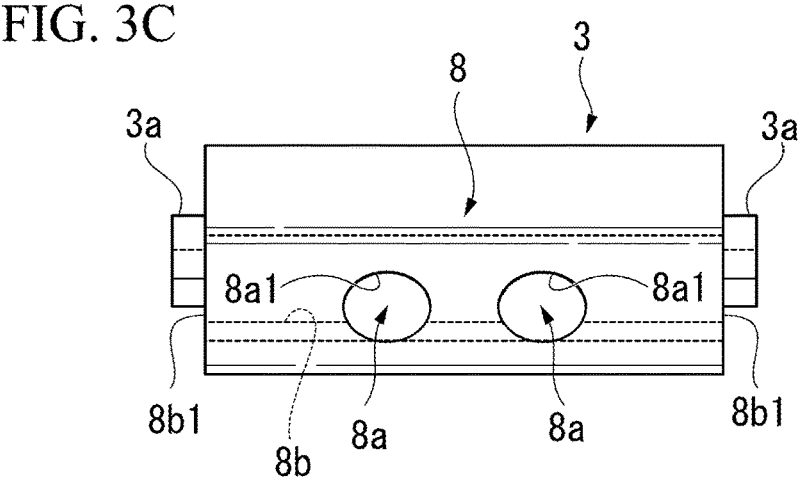
FIG. 3C is a side view obtained by viewing the tilting pad in an arrow B direction in FIG. 3A.

FIGS. 3A to 3C are enlarged views of the tilting pad 3. FIG. 3A is a front view of the tilting pad 3 obtained by viewing the tilting pad 3 in the axial direction of the rotary shaft 300, FIG. 3B is a side view thereof obtained by viewing the tilting pad 3 in the arrow A direction in FIG. 3A, and FIG. 3C is another side view thereof obtained by viewing the tilting pad 3 in the arrow B direction in FIG. 3A. The rotation direction of the rotary shaft 300 is a direction from the right side toward the left side of the tilting pad 3 in FIG. 3A (the counterclockwise direction). In addition, FIGS. 3A to 3C omit an insertion part (an insertion hole) of the tilting pad 3 into which the fixing pin 4 is inserted.

For convenience of explanation, a side of the tilting pad 3 shown in FIG. 3A is called the front side thereof, and another side thereof opposite to the front side is called the rear side thereof. In addition, based on the rotation direction of the rotary shaft 300, a side of the tilting pad 3 shown in FIG. 3B is called the leading side thereof, and another side thereof shown in FIG. 3C is called the trailing side thereof.

As shown in these drawings, the tilting pad 3 is a block-shaped member, the shape obtained by viewing the block-shaped member from the front side is an approximate sector shape (a shape obtained by removing from a sector shape, an area including the apex of the sector shape) which curves along the outer circumferential surface of the rotary shaft 300, and the sliding surface of the tilting pad 3 facing the rotary shaft 300 is coated with a white metal. In other words, the tilting pad 3 has a shape in which a rectangular parallelepiped is bent along the outer circumferential surface of the rotary shaft 300. In addition, the tilting pad 3 is provided with projections 3a which are disposed on the front and rear sides of the tilting pad 3 and are configured to engage with the side plates 5.

The tilting pad 3 is provided with an internal flow passageway 6 which allows lubricating oil to flow inside the tilting pad 3. In this embodiment, the internal flow passageway 6 provided in one tilting pad 3 includes a leading-side internal flow passageway 7 and a trailing-side internal flow passageway 8. The leading-side internal flow passageway 7 is provided on the leading side of the tilting pad 3, and the trailing-side internal flow passageway 8 is provided on the trailing side of the tilting pad 3.

The leading-side internal flow passageway 7 includes two inlet flow passageways 7a which linearly extend in the circumferential direction (a tangential direction) of the rotary shaft 300 and are arranged next to each other in the axial direction of the rotary shaft 300, and a discharge flow passageway 7b which linearly extends and penetrates the tilting pad 3 in the axial direction of the rotary shaft 300 and is connected to each inlet flow passageway 7a. The inlet flow passageway 7a includes a leading-side inflow opening 7a1 (first inflow opening) which opens toward the leading side of the tilting pad 3. The inlet flow passageway 7a guides into the discharge flow passageway 7b, lubricating oil imported from the leading-side inflow opening 7a1. The discharge flow passageway 7b includes two discharge openings 7b1 which open at two surfaces (front and rear surfaces) of the tilting pad 3 in the axial direction of the rotary shaft 300. The discharge flow passageway 7b discharges from the discharge openings 7b1 to outside of the tilting pad 3, lubricating oil supplied from the inlet flow passageways 7a.

The trailing-side internal flow passageway 8 includes two inlet flow passageways 8a which linearly extend in the circumferential direction (a tangential direction) of the rotary shaft 300 and are arranged next to each other in the axial direction of the rotary shaft 300, and a discharge flow passageway 8b which linearly extends and penetrates the tilting pad 3 in the axial direction of the rotary shaft 300 and is connected to each inlet flow passageway 8a. The inlet flow passageway 8a includes a trailing-side inflow opening 8a1 (second inflow opening) which opens toward the trailing side of the tilting pad 3. The inlet flow passageway 8a guides into the discharge flow passageway 8b, lubricating oil imported from the trailing-side inflow opening 8a1. The discharge flow passageway 8b includes two discharge openings 8b1 which open at two surfaces (front and rear surfaces) of the tilting pad 3 in the axial direction of the rotary shaft 300. The discharge flow passageway 8b discharges from the discharge openings 8b1 to outside of the tilting pad 3, lubricating oil supplied from the inlet flow passageways 8a.

In this way, the internal flow passageway 6 in this embodiment includes the leading-side inflow openings 7a1 which open toward the leading side of the tilting pad 3 in the rotation direction of the rotary shaft 300, the trailing-side inflow openings 8a1 which open toward the trailing side of the tilting pad 3 in the rotation direction of the rotary shaft 300, and the discharge openings 7b1 and the discharge openings 8b1 which open in the axial direction of the rotary shaft 300. The internal flow passageway 6 allows lubricating oil to be imported thereinto through the leading-side inflow openings 7a1 and the trailing-side inflow openings 8a1 in the circumferential direction of the rotary shaft 300, and discharges lubricating oil through the discharge openings 7b1 and the discharge openings 8b1 to outside thereof in the axial direction of the rotary shaft 300.

The internal flow passageway 6, which the tilting pad 3 has, is configured including small flow passageways (the inlet flow passageways 7a, the discharge flow passageway 7b, the inlet flow passageways 8a, and the discharge flow passageway 8b) which include openings formed at surfaces of the tilting pad 3 and have a linearly extending shape. Since each small flow passageway has a linearly extending shape, the small flow passageways can be easily formed in the tilting pad 3 using a drill or the like.

Accordingly, the tilting pad 3 in this embodiment can be easily manufactured.

The internal flow passageway 6 includes the leading-side internal flow passageway 7 provided on the leading side of the tilting pad 3, and the trailing-side internal flow passageway 8 provided on the trailing side of the tilting pad 3. Therefore, the tilting pad 3 is provided with no flow passageway passing through the middle part of the tilting pad 3 in the circumferential direction of the rotary shaft 300. Since the fixing pin 4 is inserted into the middle part of the tilting pad 3 (refer to FIG. 2B), in this embodiment, the internal flow passageway 6 can be formed in an area of the tilting pad 3 other than the middle part. Thus, the internal flow passageway 6 does not require a complicated shape thereof, and can adopt a shape which can be easily formed as described above.

As shown in FIG. 2B, the fixing pins 4 are screwed into the housing 2, and the end of the fixing pin 4 is inserted into a connection hole provided in the middle part of the tilting pad 3. The fixing pin 4 is inserted into the tilting pad 3 so that a slight gap is formed around the end of the fixing pin 4, and restricts large movement (large movement in the circumferential direction or in the axial direction of the housing 2) of the tilting pad 3 while allowing slight tilting (tilting relative to the outer circumferential surface of the rotary shaft 300) of the tilting pad 3. The fixing pin 4 is provided in each tilting pad 3.

As shown in FIG. 2A, two side plates 5 are disposed so that the tilting pads 3 are interposed between the side plates 5 in the axial direction of the rotary shaft 300. The inner wall surface (the surface facing the tilting pad 3) of each side plate 5 is provided with a recess 5a, and the side plate 5 is fixed to the housing 2 so that the projection 3a of the tilting pad 3 is engaged with the recess 5a. In addition, a slight gap is formed between each side plate 5 and each tilting pad 3 in order not to disturb tilting of the tilting pad 3.

As shown in FIG. 2B, the side plate 5 has an annular shape encircling the rotary shaft 300. The width (the length from the inner circumferential part of the side plate 5 facing the rotary shaft 300 to the outer circumferential part thereof) of the side plate 5 in the radial direction of the rotary shaft 300 is set so that a gap S2 is formed between the side plate 5 and the outer circumferential surface of the rotary shaft 300, the gap S2 exposing part of the discharge opening 7b1 and part of the discharge opening 8b1 of the tilting pad 3 to outside of the tilting-pad bearing. That is, in this embodiment, the side plate 5 forms the gap S2 which exposes part of the discharge opening 7b1 and part of the discharge opening 8b1 of the tilting pad 3 to outside of the tilting-pad bearing between the side plate 5 and the outer circumferential surface of the rotary shaft 300. In other words, the gap S2 formed between the side plate 5 and the outer circumferential surface of the rotary shaft 300 exposes at least part of the discharge opening 7b1 and at least part of the discharge opening 8b1 of the tilting pad 3 to outside of the tilting-pad bearing. That is, the gap S2 may expose the entire discharge opening 7b1 and the entire discharge opening 8b1 to outside of the tilting-pad bearing.

As shown in FIG. 2B, the side plate 5 is divided into two parts 5b and 5c in the vertical direction. A gap S3 is provided between the parts 5b and 5c (between the parts disposed next to each other). The gap S3 is used for easily discharging to outside of the side plate 5, lubricating oil which has flowed into a space between the tilting pad 3 and the side plate 5, and reduces fluid resistance, thereby making lubricating oil easily flow.

As shown in FIG. 2B, the side plate 5 has openings 5d, each opening 5d exposing to outside of the tilting-pad bearing, part of the gap S1 formed between the tilting pads 3 disposed next to each other. Similar to the gap S3 described above, the opening 5d is used for easily discharging to outside of the side plate 5, lubricating oil which has flowed into a space between the tilting pad 3 and the side plate 5, and reduces fluid resistance, thereby making lubricating oil easily flow. In addition, the opening 5d may expose the entire gap S1 to outside of the tilting-pad bearing.

In the tilting-pad bearing 1 of this embodiment having the above configurations, when lubricating oil is supplied from outside of the tilting-pad bearing into the lubricating oil-supplying hole 2e provided in the housing 2, the lubricating oil is supplied into the gap S1 formed between the tilting pads 3 disposed next to each other.

Part of the lubricating oil supplied into the gap S1 flows into the internal flow passageways 6 from the leading-side inflow openings 7a1 and from the trailing-side inflow openings 8a1 provided in the tilting pads 3. That is, in this embodiment, lubricating oil flows into the inside of the tilting pad 3 from two sides of the tilting pad 3 in the circumferential direction of the rotary shaft 300. In addition, lubricating oil which has not flowed into the internal flow passageways 6 is supplied to the outer circumferential surface of the rotary shaft 300 and is guided to the sliding surfaces of the rotary shaft 300 and of the tilting pad 3, or is discharged from the openings 5d to the outside of the side plate 5.

The lubricating oil which has flowed into the internal flow passageway 6 absorbs heat, thereby cooling the tilting pad 3, and thereafter is discharged to outside of the tilting pad 3 from the discharge openings 7b1 and 8b1 which open so that the opening direction thereof is the same as the axial direction of the rotary shaft 300. The lubricating oil discharged from the discharge openings 7b1 and 8b1 is supplied to the outer circumferential surface of the rotary shaft 300, thereafter dropping down in the vertical direction and being collected.

In the tilting-pad bearing 1 of this embodiment as described above, the internal flow passageway 6 provided in the tilting pad 3 includes the leading-side inflow openings 7a1 which open at the leading side of the tilting pad 3 in the rotation direction of the rotary shaft 300, and the trailing-side inflow openings 8a1 which open at the trailing side of the tilting pad 3 in the rotation direction of the rotary shaft 300. Therefore, in the tilting-pad bearing 1 of this embodiment, lubricating oil flows into the inside of the tilting pad 3 from both of the leading side and the trailing side thereof in the rotation direction of the rotary shaft 300. Thus, a large amount of lubricating oil can be imported into the inside of the tilting pad 3. Furthermore, in the tilting-pad bearing 1 of this embodiment, the lubricating oil, which has flowed into the internal flow passageway 6 from the leading-side inflow openings 7a1 and from the trailing-side inflow openings 8a1, is discharged from the discharge openings 7b1 and 8b1 which open in the axial direction of the rotary shaft, without flowing backward. Therefore, it is possible to make the lubricating oil smoothly flow through the internal flow passageway 6, and to increase the flow velocity of the lubricating oil in the internal flow passageway 6. Thus, according to the tilting-pad bearing 1 of this embodiment, since a large amount of lubricating oil smoothly flows through the inside of the tilting pad 3, the cooling efficiency of the tilting pad 3 can be improved.

In the tilting-pad bearing 1 of this embodiment, the gap S2 is formed between the side plate 5 and the outer circumferential surface of the rotary shaft 300, the gap S2 exposing part of the discharge opening 7b1 of and part of the discharge opening 8b1 of the tilting pad 3 to outside of the tilting-pad bearing. Therefore, discharge of the lubricating oil from the discharge openings 7b1 and 8b1 can be smoothly performed, and a large amount of lubricating oil can flow through the internal flow passageway 6, and thus the cooling efficiency of the tilting pad 3 can be further improved.

In the tilting-pad bearing 1 of this embodiment, the side plate 5 is divided into two parts (the parts 5b and 5c), and the gap S3 is provided between the two parts disposed next to each other. Furthermore, in the tilting-pad bearing 1 of this embodiment, the side plate 5 has the openings 5d which expose to outside of the tilting-pad bearing, the gaps S1 formed between the tilting pads 3 disposed next to each other.

Therefore, discharge of the lubricating oil to outside of the side plate 5 can be facilitated, thereby reducing fluid resistance, and a further large amount of lubricating oil can easily flow into the inside of the tilting-pad bearing 1. Thus, the cooling efficiency of the tilting pad 3 or the like can be further improved.

Hereinbefore, although the embodiment of the present disclosure has been described with reference to the attached drawings, the present disclosure is not limited to the above embodiment. The shape, the combination or the like of each component shown in the above embodiment is an example, and various modifications based on design requests or the like can be adopted within the scope of and not departing from the present disclosure.

Figure 4A:
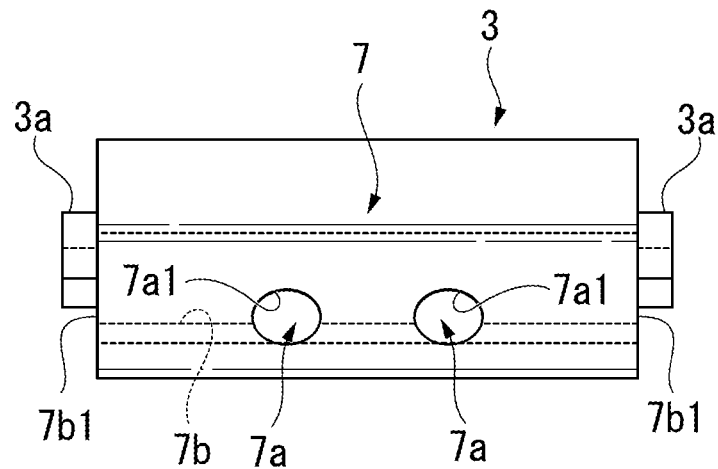
FIG. 4A is a side view of a tilting pad included in a modification of the tilting-pad bearing of the embodiment of the present disclosure.
Figure 4B:
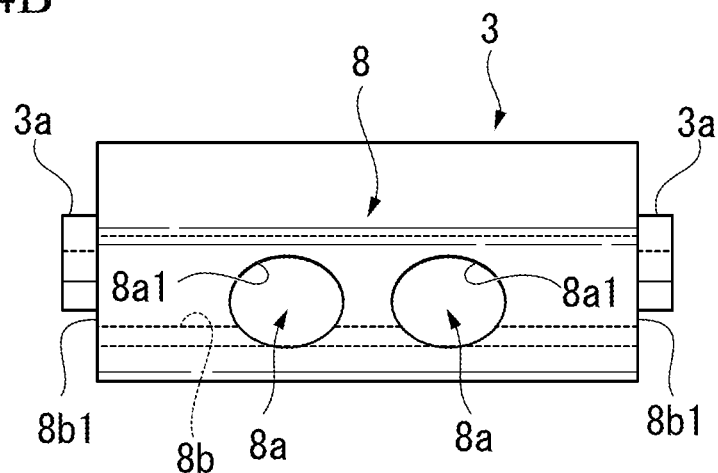
FIG. 4B is another side view of the tilting pad included in the modification of the tilting-pad bearing of the embodiment of the present disclosure.

For example, the temperature of the trailing side of the tilting pad 3 in the rotation direction of the rotary shaft 300 is higher than that of the leading side thereof. The cause thereof may be that flow of the lubricating oil occurs in the rotation direction of the rotary shaft 300 in accordance with the rotation of the rotary shaft 300, and lubricating oil supplied from the lubricating oil-supplying holes 2e is heated due to contact with the tilting pad 3 or the like while moving toward the trailing side of the tilting pad 3, whereby the cooling efficiency of the trailing side of the tilting pad 3 deteriorates. Accordingly, for example, as shown in FIGS. 4A and 4B, the opening area of the trailing-side inflow opening 8a1 may be set to be greater than that of the leading-side inflow opening 7a1.

If this configuration is adopted, the amount of lubricating oil flowing into the trailing-side inflow opening 8a1 can become greater than that into the leading-side inflow opening 7a1, and the cooling efficiency of the trailing side of the tilting pad 3 can be further improved compared with that of the leading side thereof. Thus, the temperature of the entire tilting pad 3 can become constant. In addition, the flow-passageway diameter of the trailing-side internal flow passageway 8 (the inlet flow passageway 8a and the discharge flow passageway 8b) may be set to be greater than that of the leading-side internal flow passageway 7 (the inlet flow passageway 7a and the discharge flow passageway 7b).

The above embodiment describes a configuration in which only part of the discharge opening 7b1 and part of the discharge opening 8b1 are exposed at the gap S2 between the side plate 5 and the rotary shaft 300.

However, the present disclosure is not limited thereto, and the entire discharge openings 7b1 and 8b1 may be configured to be exposed at the gap S2.

The above embodiment describes a configuration in which the side plate 5 is divided into two parts in the vertical direction. However, the present disclosure is not limited thereto, and the side plate 5 may be divided into three or more parts.

The above embodiment describes a configuration in which five tilting pads 3 are provided in the tilting-pad bearing. However, the present disclosure is not limited thereto, and the number of tilting pads can be optionally determined.

The above embodiment describes a two-stage turbo compressor. However, the present disclosure is not limited thereto, and an optional number of one or more can be adopted as the number of stages of a turbo compressor.

INDUSTRIAL APPLICABILITY

The present disclosure can be used for a tilting-pad bearing and for a turbo compressor using the tilting-pad bearing.

The invention claimed is:

1. A tilting-pad bearing comprising:
a plurality of tilting pads arranged annularly around a rotary shaft so as to form a first gap therebetween;
a housing accommodating and supporting the plurality of tilting pads from outside in a radial direction of the rotary shaft and including a lubricating oil-supplying hole provided at a position facing the first gap formed between each of the plurality of the tilting pads; and
a pair of side plates disposed so that the tilting pads are interposed between the side plates in an axial direction of the rotary shaft,
wherein each tilting pad is provided with an internal flow passageway through which lubricating oil flows,
the internal flow passageway includes:
a first inflow opening which opens toward a leading side of the tilting pad in a rotation direction of the rotary shaft,
a second inflow opening which opens toward a trailing side of the tilting pad in the rotation direction of the rotary shaft, and
a discharge opening which opens in the axial direction of the rotary shaft,
the internal flow passageway has no openings on a first surface of the tilting pad facing the rotary shaft,
the first inflow opening and the second inflow opening are provided on second surfaces of the tilting pad, which face in the circumferential direction and are different from the first surface of the tilting pad facing the rotary shaft and from a third surface of the tilting pad facing the housing, and
the discharge opening is provided on an axial surface of the tilting pad, which faces in the axial direction and is different from the first surface of the tilting pad facing the rotary shaft.

2. The tilting-pad bearing according to claim 1,
wherein a second gap is formed between each of the pair of side plates and an outer circumferential surface of the rotary shaft, and exposes at least part of the discharge opening of the tilting pad to outside of the tilting-pad bearing.

3. The tilting-pad bearing according to claim 1,
wherein each of the pair of side plates is divided into parts, and a third gap is provided between the parts disposed next to each other.

4. The tilting-pad bearing according to claim 1,
wherein each of the pair of side plates includes an opening which exposes, to outside of the tilting-pad bearing, at least part of the first gap formed between each of the plurality of tilting pads.

5. The tilting-pad bearing according to claim 1,
wherein the opening area of the second inflow opening is greater than that of the first inflow opening.

6. A turbo compressor comprising:
an impeller; and
a rotary shaft connected to the impeller,
wherein the tilting-pad bearing according to claim 1 rotatably supports the rotary shaft.

7. A tilting-pad bearing comprising:
a plurality of tilting pads arranged annularly around a rotary shaft so as to form a first gap therebetween;
a housing accommodating and supporting the plurality of tilting pads from outside in a radial direction of the rotary shaft and including a lubricating oil-supplying hole provided at a position facing the first gap formed between each of the plurality of the tilting pads; and
a pair of side plates disposed so that the tilting pads are interposed between the side plates in an axial direction of the rotary shaft,
wherein each tilting pad is provided with an internal flow passageway through which lubricating oil flows,
the internal flow passageway includes:
a first inflow opening which opens toward a leading side of the tilting pad in a rotation direction of the rotary shaft,
a second inflow opening which opens toward a trailing side of the tilting pad in the rotation direction of the rotary shaft, and
a discharge opening which opens in the axial direction of the rotary shaft, a second gap is formed between each of the pair of side plates and an outer circumferential surface of the rotary shaft, and exposes at least part of the discharge opening of the tilting pad to outside of the tilting-pad bearing, and the discharge opening is provided on an axial surface of the tilting-pad, which faces in the axial direction and is different from a first surface of the tilting-pad facing the rotary shaft.

* * * * *